United States Patent
Taira

(10) Patent No.: US 8,205,590 B2
(45) Date of Patent: Jun. 26, 2012

(54) INTAKE MANIFOLD FOR MULTIPLE-CYLINDER INTERNAL COMBUSTION ENGINE

(75) Inventor: Takahiro Taira, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 375 days.

(21) Appl. No.: 12/529,960

(22) PCT Filed: Mar. 12, 2008

(86) PCT No.: PCT/JP2008/054463
§ 371 (c)(1),
(2), (4) Date: Sep. 4, 2009

(87) PCT Pub. No.: WO2008/126584
PCT Pub. Date: Oct. 23, 2008

(65) Prior Publication Data
US 2010/0095921 A1    Apr. 22, 2010

(30) Foreign Application Priority Data
Mar. 15, 2007  (JP) ................. 2007-067539

(51) Int. Cl.
*F02M 35/10* (2006.01)
(52) U.S. Cl. ............... 123/184.38; 123/195 C
(58) Field of Classification Search ............ 123/184.21, 123/184.38, 184.42, 184.39, 184.41, 184.43–184.49, 123/184.61, 195 C
See application file for complete search history.

(56) References Cited

U.S. PATENT DOCUMENTS

| 4,741,295 | A | * | 5/1988 | Hosoya et al. | 123/184.31 |
| 4,805,564 | A | * | 2/1989 | Hudson, Jr. | 123/184.42 |
| 5,353,752 | A | * | 10/1994 | Suzuki | 123/184.61 |
| 5,524,582 | A | * | 6/1996 | Suh et al. | 123/179.8 |
| 5,655,492 | A | * | 8/1997 | Sattler et al. | 123/184.42 |
| 6,752,115 | B2 | * | 6/2004 | Fiesel et al. | 123/184.42 |
| 6,990,941 | B1 | * | 1/2006 | Bender | 123/184.21 |
| 7,100,559 | B2 | * | 9/2006 | Uchiyama | 123/184.38 |
| 2005/0263143 | A1 | * | 12/2005 | Matsuoka et al. | 123/572 |

FOREIGN PATENT DOCUMENTS

| DE | 103 00 809 A1 | 7/2004 |
| FR | 2 853 694 A1 | 10/2004 |
| JP | 20717/1990 | 11/1991 |
| JP | 112560/1991 | 11/1991 |
| JP | 2002-89272 A | 3/2002 |
| JP | 2002-195115 A | 7/2002 |
| JP | 2002-361745 A | 12/2002 |
| JP | 2003-74431 A | 3/2003 |

* cited by examiner

*Primary Examiner* — Noah Kamen
*Assistant Examiner* — Hung Q Nguyen
(74) *Attorney, Agent, or Firm* — Arent Fox LLP

(57) ABSTRACT

An intake manifold has a collective part defining an intake gas distribution chamber, and a branch intake part having a plurality of branch intake passages. The collective part includes a first section and a second section joined together to form the intake gas distribution chamber. First and a second corner parts are formed integrally with the first section and the second section, respectively. The second section is provided with a guide wall extending in both the first and second sections to cover the respective inside surfaces of the first and second corner parts. The guide wall has a guide surface for guiding the intake gas.

4 Claims, 2 Drawing Sheets

INTAKE MANIFOLD FOR MULTIPLE-CYLINDER INTERNAL COMBUSTION ENGINE

CROSS-REFERENCE TO RELATED APPLICATION

This application is a National Stage entry of International Application No. PCT/JP2008/54463, having an international filing date of Mar. 12, 2008 and claiming priority to Japanese Application No. 2007-067539, filed Mar. 15, 2007, the disclosures of each of which are hereby incorporated in their entirety by reference.

TECHNICAL FIELD

The present invention relates to an intake manifold, for a multiple-cylinder internal combustion engine, having a collective part forming an intake gas distribution chamber, and a plurality of branch intake pipes branching out from the collective part and forming branch intake passages for carrying an intake gas to combustion chambers.

BACKGROUND ART

An intake manifold, for a multiple-cylinder internal combustion engine, is disclosed in, for example, Patent Document 1, which intake manifold is provided with a guide to ensure smooth flow of intake gas from the intake manifold to the combustion chambers.
Patent Document 1: JP 2003-74431 A

DISCLOSURE OF THE INVENTION

Underlying Problem to be Solved by the Invention

In some intake manifold, for a multiple-cylinder internal combustion engine, having a collective part forming an intake gas distribution chamber and provided with an intake inlet, and a plurality of branch intake pipes branching out from the collective part and forming a plurality of branch intake passages branching out from the intake gas distribution chamber, corners of the collective part are formed in a special shape, such as a squarish shape, to ensure a sufficient rigidity for the collective part to which a negative intake pressure acts. When the branch intake pipes are formed integrally with the collective part, the shape of the collective part is determined so as to be easily molded to facilitate removing a core for molding the branch intake pipes and to avoid increasing the cost of the intake manifold due to the complicated shape of the mold. In some cases, the corners need to be formed in a special shape, such as a squarish shape, to prevent interference between the core and the collective part.

However, a shape of the collective part determined from the viewpoint of rigidity and molding sometimes obstructs the smooth flow of intake gas in the collective part, reducing the volumetric efficiency of the engine.

The present invention has been made in view of such a problem and it is therefore an object of the present invention to provide an intake manifold having a collective part of split case construction ensuring smooth flow of intake gas therethrough to improve volumetric efficiency regardless of the shape of corners of the collective part.

Means to Solve the Underlying Problem

The present invention provides an intake manifold, for a multiple-cylinder internal combustion engine, having a collective part defining an intake gas distribution chamber having an intake gas inlet, and a branch intake part having a plurality of branch intake passages respectively for carrying an intake gas to combustion chambers; wherein the collective part is built by joining together first and second sections respectively defining first and second spaces forming the intake gas distribution chamber, at least the first section is integrally provided with a corner part, the second section is provided with a guide wall extending in the first and the second section so as to cover an inside surface of the corner part, and the guide wall has a guide surface for guiding the intake gas more smoothly than the inside surface of the corner part.

Preferably, the plurality of branch intake passages are arranged in an arranging direction in which cylinders of the engine are arranged, the collective part has an intake gas inlet on one end of the arranging direction, the guide wall is opposed to the intake gas inlet, and the guide wall is disposed at a position opposing one branch intake passage of the branch intake passages, which is most remote from the intake gas inlet.

In a preferred embodiment of the invention, the guide wall has a curved surface with a maximum curvature smaller than a maximum curvature of the corner part.

Preferably, the branch intake pipes are formed integrally with the first section, the guide wall lies in an imaginary extension passage on the extension of the branch intake passage, and the corner part of the first section lies outside a region corresponding to the imaginary extension passage.

Effects of the Invention

In the intake manifold according to the present invention, the collective part is a split case structure including the first and the second section. Therefore, even if a corner is formed at least in the first section to provide the collective part with a high rigidity, the intake gas can flow smoothly through the intake gas distribution chamber regardless of the shape of the corner owing to the agency of the guide wall of the second section. Since the guide wall extends between the first and the second sections in the intake gas distribution chamber, the intake gas can flow smoothly in a wide region in the intake gas distribution chamber and hence the volumetric efficiency can be improved.

When the plurality of branch intake passages are arranged in an arranging direction in which cylinders of the engine are arranged, the collective part has an intake gas inlet on one end of the arranging direction, the guide wall is opposed to the intake gas inlet, and the guide wall is disposed at a position opposing one branch intake passage of the branch intake passages, which is most remote from the intake gas inlet, the following advantage is obtained. That is, since the guide wall is opposing both the intake gas inlet and the branch intake passage most remote from the intake gas inlet, the intake gas can be smoothly guided even to the branch intake passage most remote from the intake gas inlet.

When the guide wall has a curved surface with a maximum curvature smaller than a maximum curvature of the corner part, the intake gas can be guided far smoothly as compared with a case in which the intake gas is guided by the corner part.

When the branch parts are formed integrally with the first section, the guide wall lies in a region corresponding to the imaginary extension passage on the extension of the branch intake passage, and the corner part of the first section lies outside the region corresponding to the imaginary extension passage, the intake gas flowing into the intake gas distribution chamber can be smoothly guided to the branch intake passages. Further, a mold core for forming the branch intake passages can be removed without being obstructed by the guide wall even though the branch parts defining the branch intake passages are formed integrally with the first section. Therefore, the degree of freedom of design that forms the branch part integrally with the collective part can be increased, the mold is made simple, and hence it is possible to avoid increasing the cost of the intake manifold.

DESCRIPTION OF THE REFERENCE SIGNS

10 . . . Collective part, 11 . . . Intake gas distribution chamber, 20 . . . Branch Intake part, 22 . . . Branch Intake passage, 31 . . . Corner part, 40 . . . Guide wall, 44 . . . Guide surface M . . . Intake manifold, A . . . First section, A . . . Second section

BEST MODE FOR CARRYING OUT THE INVENTION

Preferred embodiments of the invention will be described with reference to the drawings.

Figure 1:
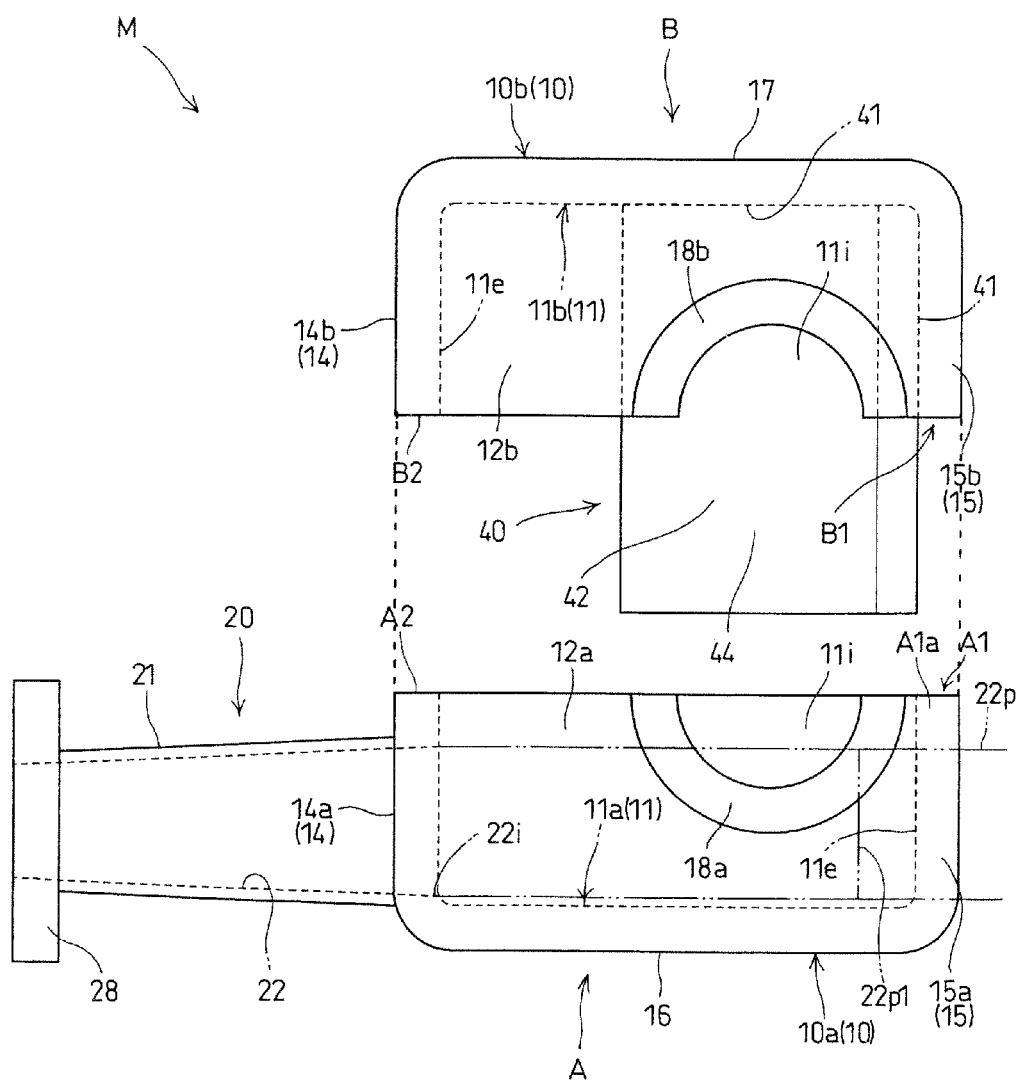
FIG. 1 is an exploded plan view of an intake manifold in a preferred embodiment of the present invention.

Referring to FIG. 1 showing, in an exploded view, an intake manifold M to which the present invention is applied, the intake manifold M is intended to be combined with an inline four-cylinder internal combustion engine, namely, a multiple-cylinder internal combustion engine for a vehicle. The internal combustion engine has an engine body including a cylinder block integrally provided with a plurality of cylinders (four cylinders in the embodiment shown) in a straight arrangement, a cylinder head joined to the cylinder block, a cylinder head joined to the cylinder block, and a head cover joined to the cylinder head.

The internal combustion engine is provided with pistons fitted in the cylinders so as to reciprocate in the cylinders, a crankshaft driven for rotation by the pistons driven by the pressure of a combustion gas generated in combustion chambers, and rotatably supported on the cylinder block, an intake system for supplying intake gas into the combustion chambers, an exhaust system for carrying the combustion gas as an exhaust gas from the combustion chambers to the outside of the internal combustion engine. Each of the combustion chambers is defined by the cylinder, the piston fitted in the cylinder, and the cylinder head.

Figure 2:
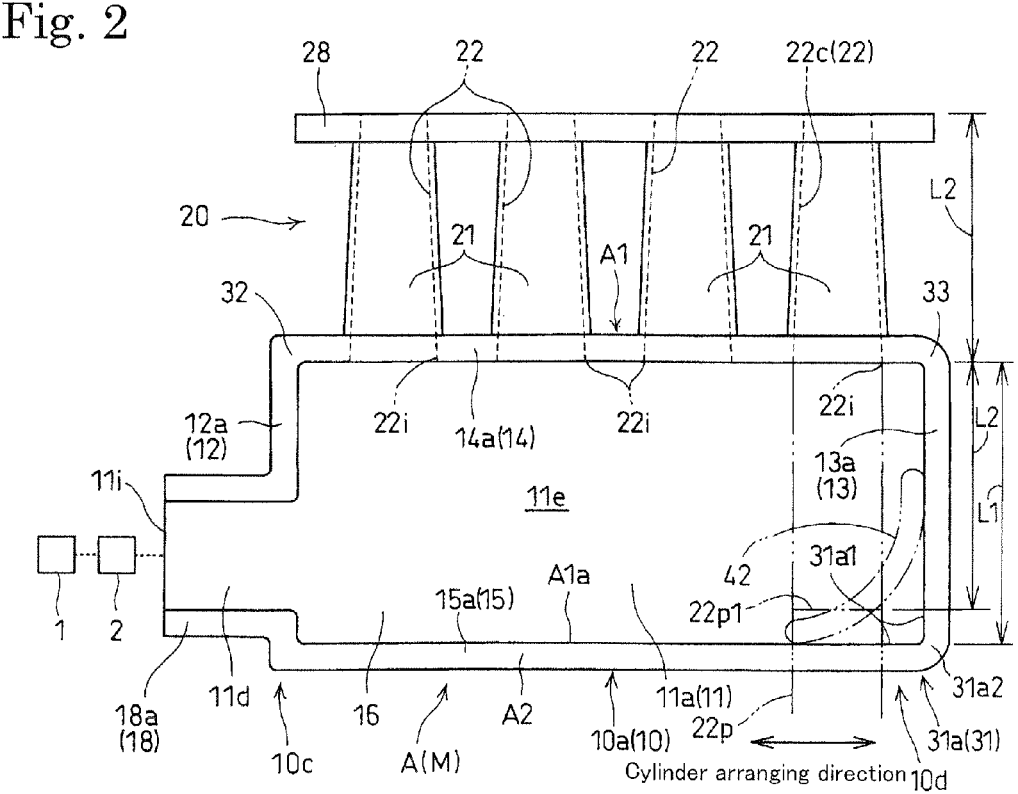
FIG. 2 is a top view of a first section included in the intake manifold shown in FIG. 1 taken from the side of a joining surface of the first section.

Referring to FIG. 2, the intake system includes an air cleaner 1 for cleaning intake gas, a throttle device 2 provided with a throttle valve for controlling the flow of intake gas containing air from the air cleaner 1, and the intake manifold M for carrying the intake gas that has passed through the throttle device 2 into the combustion chambers.

The intake gas that flows through the intake passage in the intake system is sucked through intake ports formed in the cylinder head into the combustion chambers. The intake gas is an air-fuel mixture when fuel is supplied into intake air in the intake system or intake air when fuel is supplied directly into the combustion chambers.

In this specification, "upstream" and "downstream" are used to indicate directions and positions with respect to the flowing direction of the intake gas.

Figure 3:
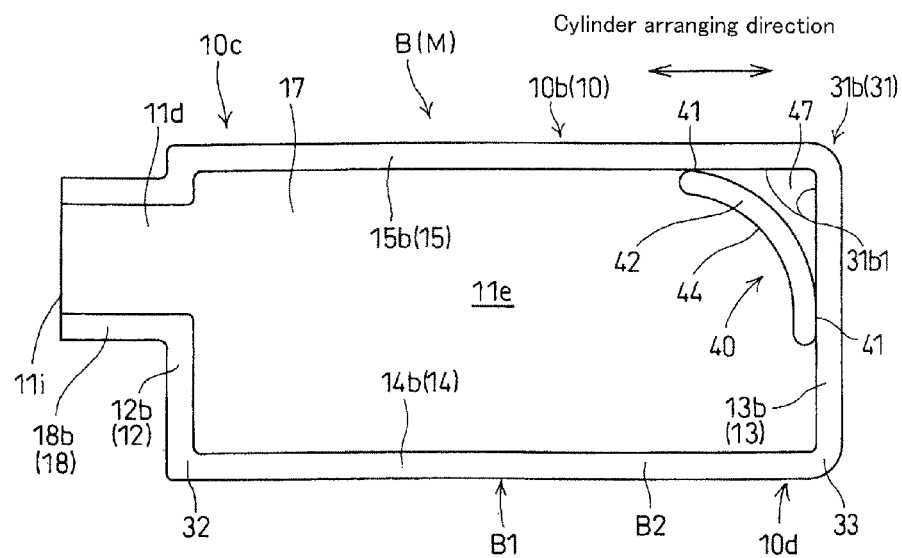
FIG. 3 is a bottom view of a second section included in the intake manifold shown in FIG. 1 taken from the side of a joining surface of the second section.

Referring to FIGS. 1, 2 and 3, the intake manifold M has a collective part 10 defining an intake gas distribution chamber 11 into which the intake gas from the throttle device 2 flows, a branch intake part 20 branching out from the collective part 10 and defining branch intake passages 22 for carrying the intake gas into the combustion chambers, and a downstream flange 28, namely, a downstream joining part.

Downstream intake pipes, not shown, defining downstream branch intake passages to be connected respectively to the branch intake passages 22 are connected to the downstream flange 28. The downstream intake pipes are connected to the cylinder head. When the internal combustion engine is so designed that the downstream flange 28 can be connected to the cylinder head, the downstream intake pipes may be omitted.

The collective part 10 has end walls 12 and 13 longitudinally opposite to each other with respect to the cylinder arranging direction, namely, a horizontal direction in FIGS. 2 and 3, a downstream side wall 14 in which the inlets 22$i$ of the branch inlet passages 22 open, an upstream side wall 15 opposite the downstream side wall 14 with respect to a direction in which the branch intake passages 22 extend, a bottom wall 16, namely, a first wall, and a top wall 17, namely, a second wall. The intake gas distribution chamber 11 is defined by integrally forming those walls 12 to 17. The intake gas distribution chamber 11 has an inlet passage 11$d$ having an inlet 11$i$, and an enlarged chamber 11$e$.

An upstream connecting part 18 is formed at one end 10$c$ of the collective part 10 with respect to the cylinder arranging direction. The throttle device 2 has a throttle body defining an intake passage in which the throttle valve is disposed. The upstream connecting part 18 connects to the throttle body. The upstream connecting part 18 defines the inlet passage 11$d$ having the inlet 11$i$. The upstream connecting part 18 is an inlet part of the collective part 10.

A squarish corner part 31 is formed at the other end 10$d$ of the collective part 10 with respect to the cylinder arranging direction. Squarish corner parts 32 and 33 similar to the corner part 31 are formed continuously with the downstream side wall 14. The corner parts 31 to 33 enhance the rigidity of the collective part 10 to which a negative pressure acts. Each of the corner parts 31 to 33 has typically a slightly curved concave corner surface but may have an angular corner surface without substantial curve.

The collective part 10 is a split case structure having a first section A with a joining surface A2, and a second section B with a joining surface B2. The joining surfaces A2 and B2 are joined air-tightly to complete the collective part 10. The first section A and the second section B define a first space 11$a$ and a second space 11$b$, respectively. When the first section A and the second section B are joined together, the spaces 11$a$ and 11B form the intake gas distribution chamber 11. The first section A and the second section B are formed individually by molding a synthetic resin in a mold. Edges A1 and B1 respectively having the joining surfaces A2 and B2 are joined together by welding, namely, a joining means.

The first section A has a first end wall 12$a$, namely, one of parts of the end wall 12, a first end wall 13$a$, namely, one of parts of the end wall 13, a first downstream side wall 14$a$, namely, one of parts of the downstream side wall 14, a first upstream wall 15$a$, namely, one of parts of the upstream side wall 15, a bottom wall 16, the branch intake part 20 having the branch intake passages 22, a first corner part 31a, namely, a part of the corner part 31 on the side of the first section A, and the downstream flange 28. Those parts of the first section A are formed integrally. The first end wall 12a, the first end wall 13a, the first downstream side wall 14a, the first upstream side wall 15a, and the bottom wall 16 form a first collective part 10a defining a first chamber 11a.

A semicylindrical first connecting part 18a (FIG. 1), namely, one of parts of the connecting part 18, is formed integrally with the first end wall 12a. The first corner part 31a is formed on the upstream side of the first downstream side wall 14a by parts of the first end wall 13a and the first upstream side wall 15a. The first corner part 31a enhances the rigidity of the first collective part 10a.

The branch intake part 20 is formed by integrally collecting intake pipes 21 respectively defining the branch intake passages 22. The branch intake passages 22 are tapered to be smaller in cross section toward the downstream side. The branch intake passages 22 are formed by mold cores when the first section A is molded in a mold. After the molding operation, the cores are pulled or removed upstream or removed into the first space 11a, i.e., into the intake gas distribution chamber 11, along imaginary extension passages 22p parallel to the branch intake passages 22 to pull out the cores from the branch intake passages 22. In FIGS. 1 and 2, an imaginary extension passage 22p on the extension of the branch intake passage 22c is indicated by two-dot chain lines. The first corner part 31a, and a first edge part A1a of the edge A1 of the upstream side wall 15 are outside an imaginary extension passage section 22p1, which is a part of the imaginary extension passage 22p, extending from the inside surface of the first downstream side wall 14a through a distance L2 equal to the length of the branch intake passages 22, whereby the cores can be removed from the branch intake passages 22 without being obstructed by the first section A; that is, the first edge part A1a is outside the region of the imaginary extension passage 22p1.

As shown in FIG. 2, the length L2 of the branch intake passages 22 is shorter than a distance L1 between the inlet 22i, and the first corner part 31a or the first edge part A1a. Thus a space available for removing the core is formed between the downstream side wall 14 and the upstream side wall 15 in the first space 11a of the intake gas distribution chamber 11.

A bend 31a2 in the first corner part 31a, namely, the bent or curved joint of the first end wall 13a and the first upstream side wall 15a, is not on the imaginary extension passage 22p. In other words, the bend 31a2 is outside the imaginary extension passage 22p.

The second section B has a second end wall 12b joined to the first end all 12a to form the end wall 12, a second end wall 13b joined to the second end wall 13a to form the end wall 13, a second downstream side wall 14b joined to the first downstream side wall 14a to form the downstream side wall 14, a second upstream side wall 15b joined to the first upstream side wall 15a to form the upstream side wall 15, a top wall 17, a second corner part 31b joined to the first corner part 31a to form the corner part 31, a guide wall 40 for guiding the intake gas so as to flow smoothly in the intake gas distribution chamber 11, a semicylindrical second connecting part 18b joined to the first connecting part 18a to form the connecting part 18. Those parts of the second section B are formed integrally. The second end wall 12b, the second end wall 13b, the second downstream side wall 14b, the second upstream side wall 15b, and the top wall 17 form a second collective part 10b defining a second chamber 11b. The second corner part 31b enhances the rigidity of the second collective part 10b.

The guide wall 40 has the shape of a plate curved in the shape of a circular arc and concave toward the intake gas distribution chamber 11. The guide wall 40 is formed integrally with the second collective part 10b so as to extend between the second end wall 13b and the second upstream side wall 15b. The guide wall 40 covers the inside surface 31b1 of the second corner part 31b. As shown in FIG. 1, the guide wall 40 extends along the second end wall 13b and the second upstream side wall 15b and projects beyond the edge B1 to the first corner part 31a.

In the intake manifold M formed by joining together the first section A and the second section B, the guide wall 40 extends in the interior of the second section B or the second space 11b and in the interior of the first section A or the first space 11a. The guide wall 40 covers the inside surface 31a1 of the first corner part 31a.

The guide wall 40 has connecting parts 41 connected to the second end wall 13b, the second upstream side wall 15b and the top wall 17, and a curved middle part 42 spaced apart from the inside surfaces 31a1 and 31b1 of the corner part 31 toward the central part of the intake gas distribution chamber 11. The connecting part 41 is connected to the second end wall 13b, the second upstream side wall 15b and the top wall 17 in an airtight manner. Since the curved part 42 is spaced apart from the corner part 31, a back space 47 of a volume smaller than that of the intake gas distribution chamber 11 is defined behind the guide wall 40 between the guide wall 40 and the corner part 31. Thus the corner part 31 protrudes to the outside relative to the guide wall 40 on the outer side of the intake gas distribution chamber 11.

The maximum curvature of a guide surface 44 of the guide wall 40, which is a part of the inside surface of the intake gas distribution chamber 11, is smaller than those of the respective inside surfaces 31a1 and 31b1 of the corner parts 31a and 31b. Therefore, the guide surface 44 can guide the intake gas in the intake gas distribution chamber 11 more smoothly than the inside surfaces 31a1 and 31b1. Since the guide surface 44 is opposite the inlet 11i and the inlet passage 11d with respect to the cylinder arranging direction, the intake gas flowing through the inlet 11i and the inlet passage 11d into the enlarged chamber 11e in the intake gas distribution chamber 11 can easily impinge on the guide surface 44. Further, since the guide surface 44 of the guide wall 40 is opposed to the inlet 22i of the branch intake passage 22 most remote from the inlet 11i to the chamber 11, the intake gas is smoothly guided to the branch intake passage 22 most remote from the inlet 11i.

The guide wall 40 is on the imaginary extension passage 22p of the branch intake passage 22c, which is the nearest to the end wall 13a and the corner part 31a among the four branch intake passages 22. In this embodiment, the guide wall 40 extends also in the imaginary extension passage section 22p1 as shown in FIGS. 1 and 2. Therefore, if the guide wall 40 were formed integrally with the first section A, the guide wall 40 would obstruct pulling out the mold core for forming the branch intake passages 22 from within the branch intake passages 22. The guide wall 40 of the intake manifold M of the present invention does not obstruct removing the core from within the branch intake passages 22.

The operation and effect of the intake manifold M in the preferred embodiment will be described.

The collective part 10 of the intake manifold M is formed by joining together the first section A and the second section B respectively defining the first space 11a and the second space 11b forming the intake gas distribution chamber 11.

The first corner part 31a and the second corner part 31b forming the corner part 31 are formed integrally with the first section A and the second section B, respectively. The guide wall 40 is formed in the second section B so as to extend in the first space 11a and the second space 11b and so as to cover the respective inside surfaces 31a1 and 31b1 of the first corner part 31a and the second corner part 31b. The guide wall 40 has the guide surface 44 capable of guiding the intake gas more smoothly than the inside surfaces 31a and 31b. The collective part 10 of the intake manifold M is a split case structure formed by joining together the first section A and the second section B. Therefore, the guide wall 40 guides the intake gas so as to flow smoothly in the intake gas distribution chamber 11 regardless of the shape of the corner part 31 even though the first corner part 31a and the second corner part 31b are formed integrally with the first section A and the second section B, respectively, to enhance the rigidity of the collective part 10. Since the guide wall 40 extends in both the first section A and the second section B, the intake gas can be made to flow smoothly in a wide region in the intake gas distribution chamber 11 and, consequently, the volumetric efficiency can be improved.

Since the guide wall 40 is formed integrally with only the second section B, the collective part 10 can be easily molded as compared with a case where the guide wall 40 is formed integrally with both the first section A and the second section B The branch intake part 20 defining the branch intake passages 22 is formed integrally with the first section A, and the guide wall 40 is on the imaginary extension passage 22p on the extension of the branch intake passage 22c. Thus the intake gas flowing into the intake gas distribution chamber 11 can be smoothly guided into the branch intake passages 22. The guide wall 40 will not obstruct pulling out the core from within the branch intake passages 22 defined by the branch intake part 20 formed integrally with the first section A. Therefore, the degree of freedom of design that forms the branch intake part 20 integrally with the collective part 10 can be increased, the mold can be made simple in structure, and hence it is possible to avoid increasing the cost of the intake manifold M.

Since the guide wall 40 is disposed on the imaginary extension passage part 22p1 of the length equal to the length L2 of the branch intake passage 22c, the width of the collective part 10, namely, a dimension in the direction of extension of the imaginary extension passage, can be made small, the size of the collective part 10 in the direction of extension is small, and the intake manifold M can guide the intake gas flowing into the intake gas distribution chamber 11 smoothly into the branch intake passages 22.

The first corner part 31a, and the first upstream side wall 15a are outside the imaginary extension passage section 22p1, which is a part of the imaginary extension passage 22p, extending from the inside surface of the first downstream side wall 14a through a distance L2 equal to the length of the branch intake passages 22. Therefore, the mold core for forming the branch intake passages 22 can be removed from within the branch intake passages 22 without being obstructed by the guide wall 40, the first corner part 31a and the first upstream side wall 15a, the degree of freedom of design that forms the branch intake part 20 integrally with the first section A can be increased, and the mold can be made simple in construction.

Possible changes in the intake manifold M in the preferred embodiment will be described.

When the first section A and the second section B are formed in proper shapes, respectively, the corner part 31 may be formed only in the first section A.

The guide wall 40 may have a shape that does not form the back space 47 between the guide wall 40 and the corner part 31.

The guide wall 40 may be disposed on the imaginary extension passage 22p outside the imaginary extension passage section 22p1.

The present invention is applicable to multiple-cylinder internal combustion engines other than the four-cylinder internal combustion engine, and is applicable to V-type or flat internal combustion engines having banks each provided with a plurality of cylinders.

The predetermined number of branch intake passages does not need necessarily equal to the number of cylinders of the internal combustion engine and may be smaller than the number of the cylinders.

Although the invention has been described as applied to an internal combustion engine for a vehicle, the present invention is applicable also to marine propulsion devices, such as an outboard motor provided with a vertical crankshaft.

The invention claimed is:

1. An intake manifold, for a multiple-cylinder internal combustion engine, having a collective part defining an intake gas distribution chamber having an intake gas inlet at one end of a cylinder arranging direction, and a branch intake part having a plurality of branch intake passages arranged in the cylinder arranging direction respectively for carrying an intake gas to combustion chambers;
   wherein the collective part is built by joining together first and second sections respectively defining first and second spaces forming the intake gas distribution chamber, the branch intake part being provided on the first section, at least the first section is integrally provided with a corner part at another end of the cylinder arranging direction, the second section is provided with a guide wall extending in the first and the second section so as to cover an inside surface of the corner part, and the guide wall has a guide surface for guiding the intake gas to the branch intake part, and
   wherein the guide wall lies in an imaginary extension passage extending from one branch intake passage, closest to the corner part, included in the branch intake passages, the guide wall being positioned on an imaginary extension passage section, which is a part of the imaginary extension passage and which extends from the one branch intake passage through a distance equal to a length of the branch intake passages.

2. The intake manifold, for a multiple-cylinder internal combustion engine, according to claim 1, wherein the branch intake part is formed integrally with the first section, and the corner part of the first section lies outside a region corresponding to the imaginary extension passage.

3. The intake manifold, for a multiple-cylinder internal combustion engine, according to claim 1, wherein the distance equal to the length of the branch intake passages is smaller than a distance along the imaginary extension passage between the corner part and an inlet of the one branch intake passage.

4. The intake manifold, for a multiple-cylinder internal combustion engine, according to claim 1, wherein the first section has a side wall extending along the cylinder arranging direction on a side confronting the branch intake passages, the side wall being positioned outside the imaginary extension passage section.

* * * * *